United States Patent Office 3,527,805
Patented Sept. 8, 1970

3,527,805
PROCESS FOR PREPARING
HYDRAZOCOMPOUNDS
Gianfranco Pregaglia, Giancarlo Bressan, and Renato Broggi, Milan, Italy, assignors to Montecatini Edison S.p.A., Milan, Italy, a corporation of Italy
No Drawing. Filed Mar. 30, 1966, Ser. No. 538,576
Claims priority, application Italy, Apr. 5, 1965, 7,505/65
Int. Cl. C07c 109/04
U.S. Cl. 260—569                           9 Claims

ABSTRACT OF THE DISCLOSURE

Described is an improvement in the process for obtaining hydrazocompounds and carboxylic acids by reduction of aromatic nitrocompounds, in the presence of naphthoquinones, with alcohols and alkali metal hydroxides. The improvement comprises using as a reducing alcohol a glycol selected from the group consisting of aliphatic, cycloaliphatic glycols from 2 to 12 carbon atoms.

---

The present invention relates to a process for obtaining hydrazocompounds and carboxylic acids by reduction of aromatic nitro compounds.

The reduction of aromatic nitrocompounds by methanol in the presence of caustic alkali is known to lead to the formation of the corresponding azooxycompounds. The same reaction can be carried to the formation of azo- or hydrazocompounds in an autoclave under high pressures and high temperatures. In the presence of catalysts, it is also possible to obtain high yields of azo or hydrazocompounds at the common boiling temperature of the mixture. See, for instance, U.S. Pat. Nos. 2,645,636 and 2,765,301. It is known however, that each increase of the reaction temperature, over the normal boiling temperature of the methanol solution, assures shorter reaction times, but involves a proportional lowering of the total yield of hydrazobenzene.

We have found, and this is an object of our invention, that the reduction of aromatic nitrocompounds can be carried out with remarkable advantages, which will be specified hereinafter, using vicinal and non-vicinal, low and medium molecular weight glycols as reducing agents.

Glycols have proven themselves to be reducing agents better than methanol, since they show a quick reducing action at reduced temperature, preferably in the presence of catalysts of the quinone type. Furthermore, the hydrazocompound yields are particularly high. It is also possible to separate the practically pure product, by diluting the crude reaction product.

A further advantage of the present process over that of the prior art is the possibility herein of easily recovering, near the hydrazoderivative, also the compounds deriving from the oxidation of glycol, which compounds in some cases are of considerable value. For instance, ethylene glycol gives sodium oxalate and the sodium salt of glycolic acid with high yields by working under controlled temperature conditions. At low temperature, sodium glycolate is almost exclusively obtained.

The production of oxalates and other oxidation products; the high yield of pure hydrazocompound within very short reaction times for this type of reduction processes; and the use of simple apparatus at atmospheric pressure, contribute to make our process economical and advantageous.

Our invention has as a further object, a process for the preparation of aromatic hydrazocompounds by the reduction in alkaline medium of aromatic nitrocompounds or of the corresponding intermediate reaction products, as nitrous, azooxy and azocompounds included. This process is utilized with glycols or mixtures of glycols, in the presence of catalysts of the quinone type.

Vicinal or non-vicinal, aliphatic or cycloaliphatic glycols, having from 2 to 12 carbon atoms, such as ethylene glycol, propylene glycol, di- and triethylene glycols and mixtures of various polyethylene glycols obtained as byproducts in the preparation of ethylene glycol are used as reducing agents. Other higher glycols, suitable as reducing agents, are for instance: butane-1,2-diol, butane-2,3-diol, pentane-1,2-diol, hexane-2,3-diol, cyclohexane-1,2-diol. Vicinal diols are preferred. Other polyhydroxylated compounds, such as glycerol and hexane-1,2,4-triol can also be used as reducing agents. In the case, where the glycol has a solvent action, it is used in excess of the theoretical amount necessary for the reaction. It is used in amounts from 1.5 to 2 mols for each mol of nitrocompound.

In the reaction between ethylene glycol and nitrobenzene, the amount of glycol is calculated according to the equation:

$$8C_6H_5NO_2 + 5CH_2OH + 10NaOH \longrightarrow$$
$$\phantom{8C_6H_5NO_2 + 5}|\phantom{H_2OH + 10NaOH \longrightarrow}$$
$$\phantom{8C_6H_5NO_2 + 5}CH_2OH$$

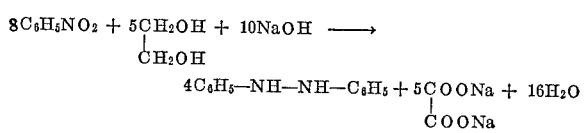

When the reaction is carried out in the presence of diluents, the amount of glycol necessary can be reduced to values equal to or only a little greater than the stoichometric values. With a mixture of glycol and methanol, the former is present in the stoichiometric ratio with the nitrocompound and sufficient of the latter is added to make the reaction mass, fluid under the desired conditions: from 0.1 to 3 parts of methanol are practically used for one part by weight of glycol. Organic solvents, which are inert under the reaction conditions, such as dioxane, tetrahydrofuran, and methanol can be used as diluents. The methanol added to the glycol does not act as reducing agent and it is found unchanged at the end of the reaction. The caustic alkali can be used in amounts varying from 1.4 to 2 mols for each mol of nitroderivative.

A convenient operating procedure, according to the present invention, is to prepare a concentrated solution of sodium hydroxide in warm glycol. After addition of the promoter, the nitrocompound is allowed to slowly drop into the mixture under agitation so as to control the exothermic degree of the reaction. At the end of the feeding of the nitroderivative, the reduction is completed by heating the reaction mixture for from 1 to 5 hours, at a controlled temperature between 40 and 120° C., according to the reducing agent used. For instance, when using ethylene glycol, it is not advisable to exceed 100° C., and when using propylene glycol, it is not advisable to exceed 75° C.

Although some glycols are also able, in the absence of catalysts, to reduce the aromatic nitroderivatives to hydrazocompounds at high temperatures, it is preferable to carry out the reaction, in the presence of catalysts, in order to reach the highest yields within the shortest times. The amount of the catalyst added to the nitrocompound varies between 0.1 and 5% by weight, preferably 0.5–2.5%.

We have ascertained that 2-hydroxy-1,4-naphthoquinone (0.362V) is a catalyst having a high activity in the reduction, according to the present invention, i.e. with glycols. This promoter shows an outstanding chemical stability contrasted to other quinones, so that at the end of the reaction, it can be easily recovered, after separation of the hydrazoderivative, by mere dilution of the alkaline solution with water or with methanol.

The generally used quinone compounds, whereby the products are recovered at the end of the reaction, by acidification of the alkaline waters, have a chemical structure more or less variable and show poor catalytic activity. On the other hand, 2-hydroxy-1,4-naphthoquinone is recovered as the sodium salt of the quinone and is recycled as such instead of fresh catalyst. The quantity of promoter recovery depends on the nature of the glycol used and especially on the reaction conditions. For instance, when working in propylene glycol and under relatively mild reaction conditions, up to 90% of the starting 2-hydroxy-1,4-naphthoquinone has been recovered. The possibility of recycling part of the used activator is particularly economically advantageous.

At the end of the reaction, in order to separate the various products, the mixture is diluted with water (about an equal volume of water) in order to precipitate the hydrazo compound that is separated by filtration. The alkaline filtrate is further diluted in order to promote the precipitation of the sodium salt of the 2-hydroxy-1,4-naphthoquinone which is separated. The diluents (methanol), if present, are recovered from the remainder solution and the solution is concentrated by evaporating off the water. The sodium salts of the carboxylic acids are then precipitated by addition of methanol or the corresponding calcium salts by addition of a concentrated $CaCl_2$ solution after neutralization.

Para and orthobenzoquinone and their derivatives (for instance the 2,5-dihydroxy-1,4-benzoquinone and the 4,5-dimorpholine-ortho-benzoquinone) have also a certain catalytic activity, but generally the reduction stops at the azocompound by working under moderate temperatures with these catalysts.

In this type of reaction, it appears that the catalytic activity of the quinones depends upon the value of their oxyreduction potential, in addition to the chemical stability of the quinone themselves in the strongly alkaline reaction medium. An effective catalytic action in the terminal phase of the reaction, that is in the reduction azocompound-hydrazocompound, is found in those quinones having normal potentials intermediate between those clearly oxidizing, such as parabenzoquinone (0.715V) and those of the poor oxidizing quinones, such as the 9,10-anthraquinone (0.154V). In this preferred class, besides the above mentioned 2-hydroxy-1,4-naphthoquinone, are 1,4-naphthoquinone (potential 0.48V) and many derivatives of the 1,2- and 1,4-naphthoquinone.

Some promoters are particularly effective, when the reducing agent used is methanol (for instance 1,4-naphthoquinone and its reaction products with sulphide or sodium metha-disulphite), but show a lower activity when the reducing agent is the ethylene- or propylene-glycol. On the other hand, the most effective promoters in the presence of these glycols do not have a comparable action in methanol. This can be understood by consideration of the minor oxidizability of methanol in respect of the ethylene and propylene glycols.

The following examples are to illustrate, without limiting the scope of the present invention. The parts reported in the examples, indicate parts by weight.

EXAMPLE 1

1.18 parts of 2-hydroxy-1,4-naphthoquinone, 33.4 parts of NaOH, 0.5 parts of sodium dodecylbenzenesulphonate as dispersing agent, and 53 parts of 1,2-propandiol (propylene glycol) are introduced in a glass cylinder, provided with stirrer, reflux condenser and thermometer. 56 parts of nitrobenzene are dropped in the mass within 5 hours at 60° C. At the end of the addition, the heating of the mixture is continued for 1 hour at the same temperature. The mass is then left to cool to 40° C. and 120 parts of water are added. The precipitate is decanted and filtered. The solid product is washed by decantation with 800 parts of water in total; then it is dried. A product consisting of 99% of hydrazobenzene and 0.7% of azobenzene is obtained with a yield of 96% (calculated on nitrobenzene). The purity degree of the hydrazobenzene is confirmed by the examination of the I.R. spectrum.

The filtration waters, after settling for some hours, deposit 0.65 part of the sodium salt of the 2-hydroxy-1,4-naphthoquinone, which is easily recovered by filtration.

EXAMPLE 2

The work is carried out with the same modalities of Example 1. 1.18 parts of 2-hydroxy-1,4-naphthoquinone, 33.4 parts of NaOH and 0.5 parts of sodium dodecylbenzensulphonate are dissolved at 80° C. in 56 parts of ethylene glycol. 56 parts of nitrobenzene are dropped in the mixture within 4 hours. At the end of the addition, the whole is heated at 98° C. for 4 hours. The yield is 98% of a product consisting of 97% hydrazobenzene and 3% azobenzene.

EXAMPLE 3

1.18 parts of 2-hydroxy-1,4-naphthoquinone, 0.5 part of sodium dodecylbenzensulphonate, 33.4 parts of NaOH are dissolved at 80° C. in 36 parts of propylene glycol and 20 parts of $CH_3OH$. 56 parts of nitrobenzene are dropped within 1 hour 50 minutes at the same temperature. The whole is then heated for 6 hours at 98° C. The yield is 95% in form of solid product consisting of 99.3% hydrazobenzene and 0.7% azobenzene.

EXAMPLE 4

1.18 parts of 2-hydroxy-1,4-naphthoquinone, 0.5 part of sodium dodecylbenzensulphonate, 33.4 parts of NaOH are dissolved at 80° C. in 28.8 parts of propylene glycol and 19 parts of $CH_3OH$. The amount of glycol corresponds to the stoichiometric amount necessary for the reduction to hydrazobenzene. 56 parts of nitrobenzene are dropped within 1 hour. The heating at 98° C. is continued for 12 hours. The yield is 97.1% in the form of a solid product, consisting of 95% hydrazobenzene and 4.8% of azobenzene.

EXAMPLE 5

1.18 parts of 2-hydroxy-1,4-naphthoquinone, 0.5 part of sodium dodecylbenzensulphonate, 33.4 parts of NaOH are dissolved at 85° C. in 106 parts of triethylene glycol, $HOCH_2$—$(CH_2OCH_2)_2$—$CH_2OH$. 56 parts of nitrobenzene are dropped within 2 hours. The whole is then heated for 14 hours at 97° C. The yield is 95% in the form of a solid product, consisting of 96% hydrazobenzene and of 3.6% azobenzene.

EXAMPLE 6

1.18 parts of 2-hydroxy-1,4-naphthoquinone, 0.5 part of sodium dodecylbenzensulphonate, 33.4 parts of NaOH are mixed with 79 parts of glycerol and heated at 100° C. 56 parts of nitrobenzene are dropped in the mass within 3 hours 30 minutes. The whole is then heated for 4 hours at 110° C. and for 14 hours at 115° C. The yield is 45% in the form of a solid product, consisting of 72% hydrazobenzene and of 26% azobenzene.

EXAMPLE 7

1.18 parts of 2-hydroxy-1,4-naphthoquinone, 0.5 part of sodium dodecylbenzensulphonate, 33.4 parts of NaOH are introduced in 53 parts of propylene glycol and heated at 95° C. 56 parts of nitrobenzene are dropped within 2 hours and then the whole is heated at 100° C. for a further 2 hours. The yield of solid product is 76.5%, consisting exclusively of pure hydrazobenzene (confirmed by the I.R. spectrum). The concentrated mother liquors deposit, upon standing, 90% of the 2-hydroxyl-1,4-naphthoquinone in the form of sodium salt.

EXAMPLE 8

1.2 parts of sodium salt of the 2-hydroxy-1,4-naphthoquinone (recovered from the test of Example 7), 0.5 parts of sodium dodecylbenzensulphonate, 33.4 parts of NaOH are introduced in 56 parts of ethylene glycol and heated at 85° C. 56 parts of nitrobenzene are dropped within 1 hour 30 minutes and the whole is heated for 2 hours at 95° C. and for 4 hours at 100° C. The yield is 97% in the form of a solid product, consisting of hydrazobenzene (93%) and of azobenzene (6.7%).

EXAMPLE 9

1.18 parts of 2-hydroxy-1,4-naphthoquinone, 0.5 part of sodium dodecylbenzensulphonate, 27.1 parts of NaOH are dissolved in 49 parts of ethylene glycol at 85° C. 56 parts of nitrobenzene are dropped in the mass within 3 hours and the heating is prolonged for 5 hours at 100° C. The yield is 99.3% of solid product consisting of hydrazobenzene (40.2%) and of azobenzene (59.1%).

EXAMPLE 10

1.18 parts of 2-hydroxy-1,4-naphthoquinone, 0.5 part of sodium dodecylbenzensulphonate, 33.4 parts of NaOH are dissolved in 56 parts of ethylene glycol at 85° C. 56 parts of nitrobenzene and dropped in the mass within 2 hours 50 minutes. At the end of the addition, the whole is heated for 5 hours 30 minutes at 100° C. The yield is 95.5% in the form of a solid product, on the nitrobenzene; it consists of 96.3% hydrazobenzene and of 3.6% azobenzene. The filtration mother liquors are concentrated to a little volume by evaporating the water. The addition of denaturated methanol causes the precipitation of the salts of the acids, which form the oxidation products of the ethylene glycol. After filtration, washing with CH₃OH and drying, 30 parts of a white product consisting of the sodium salt of glycolic acid (89%) and of sodium oxalate (10%) are obtained.

EXAMPLE 11

1.18 parts of 2-hydroxy-1,4-naphthoquinone, 0.5 part of sodium dodecylbenzensulphonate, 33.4 parts of NaOH are dissolved at 85° C. in 56 parts of ethylene glycol. 56 parts of nitrobenzene are dropped in the mass within 3 hours and 30 minutes. At the end the whole is heated at 95° C. for 16 hours. The yield is 97% of solid product, consisting of 97% hydrazobenzene and of 2.7% azobenzene. The filtration waters, concentrated and treated with denaturated methanol, deposit 33 parts of a product, consisting of sodium oxalate (9%) and sodium salt of glycolic acid (90%).

EXAMPLE 12

1.18 parts of 2-hydroxy-1,4-naphthoquinone, 0.5 part of sodium dodecylbenzensulphonate, 33.4 parts of NaOH are mixed with 36 parts of propylene glycol at 70° C. and 20 parts of methanol. At the same temperature, 56 parts of nitrobenzene are dropped within 5 hours. At the end, the whole is heated for 2 hours always at 70° C. Before adding the water, 90% of methanol is recovered by evaporation under vacuum. The operation is then carried out in the usual way. The yield is 99.8% in the form of a solid product consisting of hydrazobenzene (81%) and of azobenzene (18.1%).

EXAMPLE 13

1.15 parts of 2-hydroxyl-1,4-naphthoquinone, 0.5 part parts of sodium dodecylbenzensulphonate, 33.4 parts of NaOH are dissolved at 95° C. in 66 parts of ethylene glycol. 20 parts of azobenzene are added in little portions. At the end, the whole is heated at 95° C. for 3 hours. The yield is 95.9% in the form of a solid product, consisting of 97% of hydrazobenzene and of 2.9% of azobenzene.

EXAMPLE 14

1.18 parts of 2-hydroxy-1,4-naphthoquinone, 0.5 part of sodium dodecylbenzenesulphonate, 33.4 parts of NaOH are dissolved at 95° C. in 56 parts of ethylene glycol. At the same temperature, 30 parts of para-nitrotoluene are added to the mass in little portions. At the end, the whole is heated at 100° C. for 3 hours, at 110° C. for 1 hour. The yield as solid product is 92%, consisting of 4.5% hydrazotoluene and of 95.2% azotoluene.

EXAMPLE 15

1.18 parts of 2-hydroxy-1,4-naphthoquinone, 0.5 part of sodium dodecylbenzensulphonate, 33.4 parts of NaOH are dissolved at 80° C. in 83 parts of 1,4-butandiol. In the mixture, 56 parts of nitrobenzene are dropped within 4 hours. At the end, the heating at 80° C. is continued for 2 hours. The yield as solid product is 82%, consisting of 99.1% of hydrazobenzene and 0.9% of azobenzene.

EXAMPLE 16

1.18 parts of 2-hydroxy-1,4-naphthoquinone, 0.5 part of dodecylbenzenesodium sulphonate, 33.4 parts of NaOH are dissolved at 80° C. in a mixture consisting of 5.6 parts of CH₃OH and 42.5 parts of ethylene glycol, 56 parts of nitrobenzene are dropped in the mass within 4 hours, 30 minutes. The temperature is brought to 90° C. for 12 hours. The yield is 99% of solid product, consisting of hydrazobenzene (98.6%) and of azobenzene (1.1%). The oxidation products of ethylene glycol, recovered from the filtration mother liquors, are 36.5 parts in the form of a white product, of which 96% is the sodium salt of glycolic acid and 3% is sodium oxalate.

EXAMPLE 17

0.27 part of 2-hydroxy-1,4-naphthoquinone, 0.2 part of sodium dodecylbenzenesulphonate, 7.6 parts of NaOH are dissolved in 15 parts of 1,2-cyclohexandiol at 80° C. and 16 parts of CH₃OH. 12.7 parts of nitrobenzene are dropped in the mixture within 2 hours. At the end of the addition, the heating is continued for a further 2 hours; the yield on solid product is 92.5%, consisting of hydrazobenzene (38.5%) and of azobenzene (61.5%).

EXAMPLE 18

1.18 parts of 2-hydroxy-1,4-naphthoquinone, 0.5 part of sodium dodecylbenzensulphonate, 33.4 parts of NaOH are dissolved in 85° C. in 36.5 parts of propylene glycol and 15.5 parts of dioxane, 46 parts of nitrobenzene are dropped in the mixture within 2 hours; at the end of the addition, the heating is continued for a further 20 minutes at 85° C. The yield is 94% in the form of a solid product, consisting of hydrazobenzene (96.3%) and of azobenzene (3.6%).

We claim:
1. In the process for reducing nitrobenzene to hydrazobenzene and nitrotoluene to hydrazotolulene, in the presence of naphthoquinones, with alcohols and alkalimetal hydroxides, the improvement which comprises using as a reducing alcohol an alkanediol having from 2 to 12 carbon atoms and mixtures thereof.

2. A process according to claim 1, wherein ethylene glycol is used as the alkane-diol.

3. A process according to claim 1, wherein 1,2-propandiol is used as the alkane-diol.

4. A process according to claim 1, wherein a mixture of polyethylene glycols, obtained as by-products in the preparation of ethylene glycol, is used as the reducing alcohol.

5. A process according to claim 1, wherein from 1.5 to 2 mols of diol are used for each mol of nitrocompound in the absence of diluents.

6. A process according to claim 1, wherein a substantially stoichiometric amount of diol with respect to the nitrocompound is used in the presence of diluents.

7. A process according to claim 6, wherein an organic solvent, inert under the reaction conditions, is used as diluent.

8. A process according to claim 7, wherein a compound selected from tetrahydrofuran methanol and dioxane is used as diluent.

9. A process according to claim 1, wherein 2-hydroxy-1,4-naphthoquinone is used as the catalyst.

References Cited

UNITED STATES PATENTS

| 2,645,636 | 7/1953 | Sogn | 260—569 X |
| 2,794,046 | 5/1957 | Sogn | 260—569 X |
| 2,765,301 | 10/1956 | Cushion | 260—569 X |
| 2,744,935 | 5/1956 | Johner | 260—569 X |

ROBERT V. HINES, Primary Examiner

U.S. Cl. X.R.

260—143, 144, 531